United States Patent [19]

Fluck

[11] Patent Number: 4,921,398

[45] Date of Patent: May 1, 1990

[54] APPARATUS FOR STACKING AND CONVEYING WAFER-LIKE ARTICLES

[75] Inventor: René Fluck, Schleitheim, Switzerland

[73] Assignee: SIG Schweizerische Industrie-Gesellschaft, Neuhausen am Rheinfall, Switzerland

[21] Appl. No.: 172,320

[22] Filed: Mar. 23, 1988

[30] Foreign Application Priority Data

Mar. 23, 1987 [CH] Switzerland .................. 1090/87

[51] Int. Cl.$^5$ .................. B65B 35/40; B65G 57/00
[52] U.S. Cl. .................. 414/798.7; 53/532; 53/542; 198/464.2; 198/468.9; 198/689.1; 414/790.4; 414/790.5; 414/798.5
[58] Field of Search .................. 53/532, 542; 198/464.2, 198/468.9, 689.1; 414/47, 106, 107, 108, 798.5, 798.7, 790.4, 790.5, 790.6

[56] References Cited

U.S. PATENT DOCUMENTS

| | | | |
|---|---|---|---|
| 1,971,574 | 8/1934 | Moon .................. | 414/107 |
| 4,176,993 | 12/1979 | Luginbühl .................. | 414/106 |
| 4,291,519 | 9/1981 | Johnson .................. | 53/250 X |
| 4,417,837 | 11/1983 | Pinto et al. .................. | 414/47 X |
| 4,590,743 | 5/1986 | Hardage .................. | 53/532 X |
| 4,712,356 | 12/1987 | Hardage et al. .................. | 53/532 X |
| 4,718,534 | 1/1988 | Harper .................. | 198/464.2 X |
| 4,736,570 | 4/1988 | Hardage et al. .................. | 53/532 X |
| 4,768,328 | 9/1988 | Mims .................. | 53/532 |

FOREIGN PATENT DOCUMENTS 2713205 9/1978 Fed. Rep. of Germany .
3610953 10/1986 Fed. Rep. of Germany .
2044230 10/1980 United Kingdom .

Primary Examiner—Robert J. Spar
Assistant Examiner—Janice Krizek
Attorney, Agent, or Firm—Spencer & Frank

[57] ABSTRACT

An apparatus for forming consecutive groups of face-to-face stacked, flat articles includes an input conveyor for advancing the articles arranged in a flat-lying orientation and in a column of indeterminate length; a downwardly curving track arranged for receiving the articles from the input conveyor; a stock-forming device arranged for performing stacking steps by consecutively taking articles from the track and moving each article onto a trough into a face-to-face engagement with an outermost article of a group being under formation on the trough. There is provided a stepping motor connected to the stack-forming device for operating it in steps; a sensor arranged upstream of the stack-forming device responds to a passage of each article on the track. The sensor is connected to the stepping motor to operate it when the sensor responds. When the group has reached a predetermined number of articles or length, a mechanism discharges the group from the trough into a receptacle.

9 Claims, 4 Drawing Sheets

APPARATUS FOR STACKING AND CONVEYING WAFER-LIKE ARTICLES

BACKGROUND OF THE INVENTION

This invention relates to an apparatus for stacking and conveying wafer-like articles, particularly baked confectionery items, such as cookies, crackers, biscuits or the like. The apparatus includes a supply conveyor on which the articles are supported in a flat-lying orientation and are advanced in a column of undetermined length to a downwardly-curving track adjoining the supply conveyor. The articles are lifted off the curved track by a stack-forming device and moved into a face-to-face contact with the outermost article of a stack under formation.

An apparatus of the above-outlined type is described, for example, in United Kingdom Patent No. 2,044,230, wherein a column of articles which are delivered from a continuous baking oven in a flat-lying and irregularly spaced orientation, is transformed into a stack of face-to-face engaging articles which are further advanced to a conveyor belt. In this operation the articles are brought almost into a vertical orientation on a curved track and are, by means of a constantly rotating toothed stacking wheel, set against the trailing end of an earlier-formed, horizontally oriented stack. This apparatus involves problems if consecutive articles have a too small or a too large spacing from one another. In the former case, the stacking step is interfered with, whereas in the latter case, the stacking wheel frictionally engages the trailing article of the stack for an excessive period.

Between the known apparatus and a packing machine the articles are conveyed and temporarily stored in the usual manner over conveyor tracks of significant length. Upstream of the packing machine the continuous stack is divided into groups and the groups further monitored, for example, by weighing. In these additional manipulations, risks are high that particularly the edges of the delicate articles are damaged.

SUMMARY OF THE INVENTION

It is an object of the invention to provide an improved apparatus of the above-outlined type which ensures a gentle handling of the delicate articles.

This object and others to become apparent as the specification progresses, are accomplished by the invention, according to which, briefly stated, the apparatus for forming consecutive groups of face-to-face stacked, flat articles includes an input conveyor for advancing the articles arranged in a flat-lying orientation and in a column of indeterminate length; a downwardly curving track arranged for receiving the articles from the input conveyor; a stack-forming device arranged for performing stacking steps by consecutively taking articles from the track and moving each article onto a trough into a face-to-face engagement with an outermost article of a group being under formation on the trough. There is provided a stepping motor connected to the stack-forming device for operating it in steps; a sensor arranged upstream of the stack-forming device responds to a passage of each article on the track. The sensor is connected to the stepping motor to operate it when the sensor responds. When the group has reached a predetermined number of articles or length, a mechanism discharges the group from the trough into a receptacle.

By virtue of the stack-forming device controlled by a sensor, it is avoided that the stack forming device, in case of large distances between articles, frictionally engages the last article in the stack. In the arrangement according to the invention, the stack is formed in a magazine and upon reaching a predetermined number of articles or a predetermined group length, the group is charged into a pallet. The articles are then optimally protected during their manipulation up to the packing machine.

While German Offenlegungsschrift No. 2,713,205 describes a stack-forming device which is stepwise switched as a function of a sensor, the stack-forming device is not adapted for use with a device disclosed in the earlier-cited United Kingdom Patent No. 2,044,230.

A suction wheel for the transfer of wafer pieces into molds is known from German Offenlegungsschrift No. 3,610,953. In this apparatus, however, it is a precondition that the articles be supplied in uniform distances.

DESCRIPTION OF THE PREFERRED EMBODIMENTS

Figure 1:
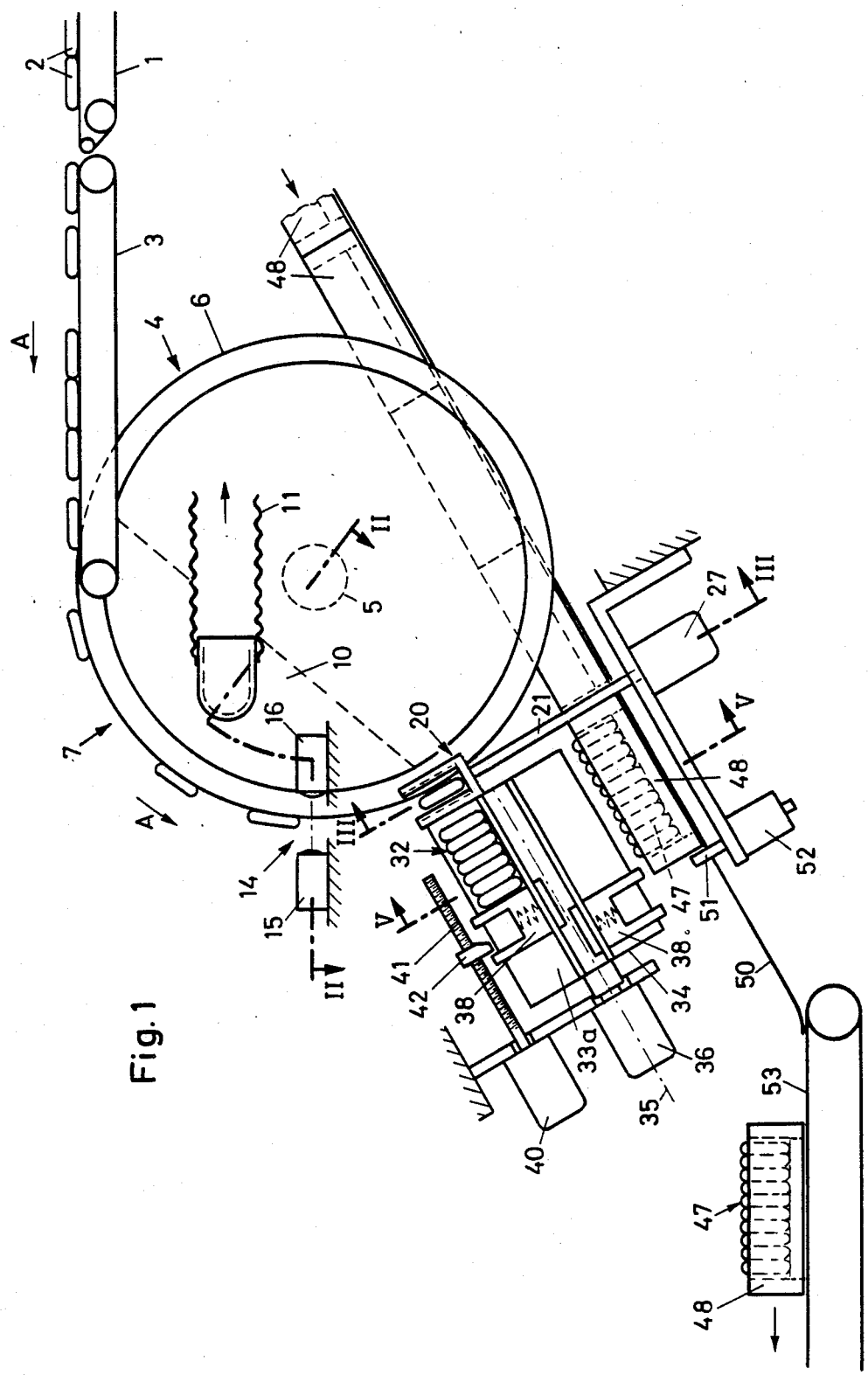
FIG. 1 is a schematic side elevational view of a preferred embodiment of the invention.

Turning to FIG. 1, a supply conveyor 1 advances nonuniformly spaced articles 2 to two laterally spaced parallel conveyor belts 3 (only one is visible) which run at identical speeds. A cylindrical suction wheel 4 having a horizontally oriented rotary shaft 5 and being of small thickness (small axial height) is arranged for rotation between the conveyor belts 3. The periphery 6 of the suction wheel 4 forms a curved track 7 which at the frontal (discharge) end of the conveyor belts 3 slightly projects upwardly therefrom and is thus able to take over articles from the conveyor belts 3. The circumferential speed of the suction wheel 4 is greater than the speed of the conveyor belts 3, as a result of which the articles 2 will be arranged at a distance from one another on the curved track 7 even if on the conveyor 1 they were in a contacting relationship.

Figure 2:
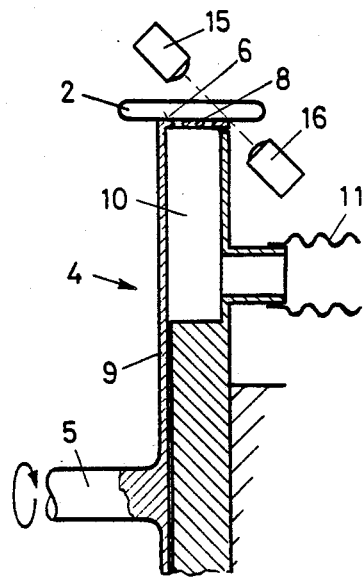
FIG. 2 is a sectional view taken along line II—II of FIG. 1.

Also referring to FIG. 2, the cylindrical wall 8 of the suction wheel 4 is perforated and is unilaterally connected by a disc 9 with the shaft 5. Between the disc 9 and the wall 8 there is formed a segment-shaped suction chamber 10 provided with a suction nipple 11 which, in turn, is connected with a vacuum source (not shown). The articles which are pressed by the vacuum against the track 7, project bilaterally beyond the periphery 6 of the suction wheel 4. On the curved track 7 there is arranged an optical barrier 14 formed of a light source 15 and a photodiode 16 and oriented in such a manner that the light path between the two components 15 and 16 is interrupted by each passing article 2.

Figure 3:
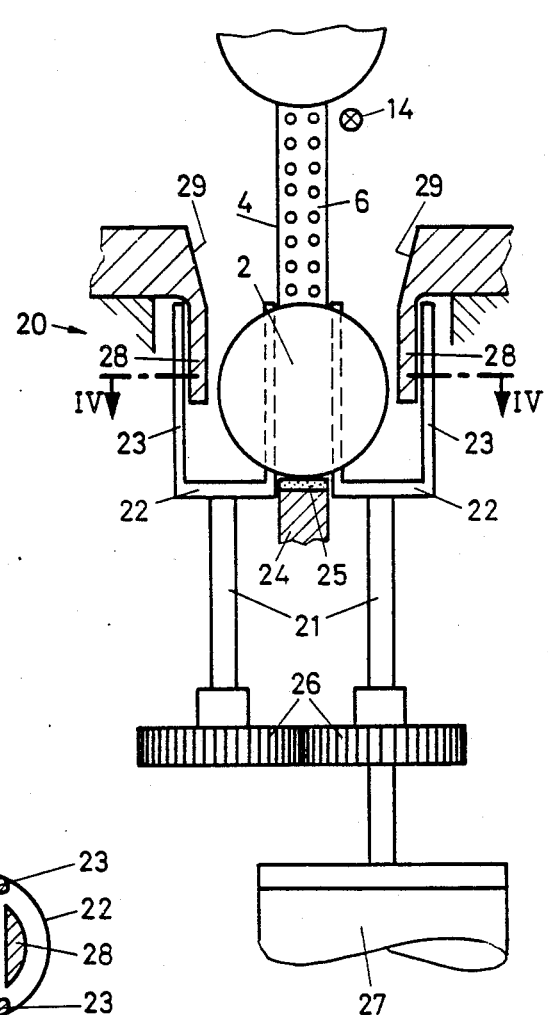
FIG. 3 is a sectional view taken along line III—III of FIG. 1.
Figure 4:
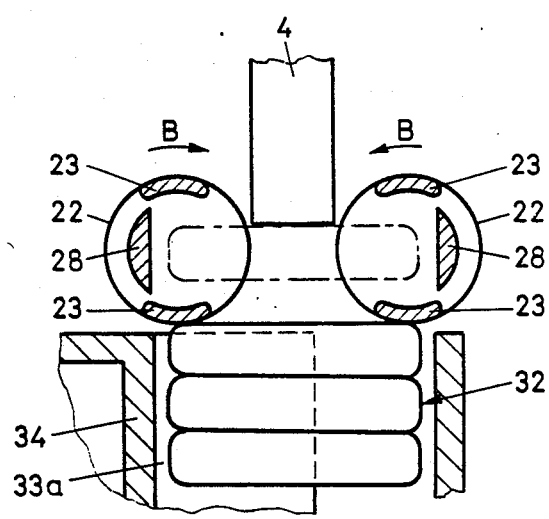
FIG. 4 is a sectional view taken along line IV—IV of FIG. 3.

Reverting once again to FIG. 1, and also referring to FIGS. 3 and 4, in the direction of advance A immediately downstream of the optical barrier 14 there is arranged a stacking device 20 adjacent the periphery 6 of the suction wheel 4. The suction chamber 10 extends from slightly upstream of the transfer location between the belts 3 and the suction wheel 4 up to the stacking device 20. The stacking device 20 is formed of two parallel-arranged rotary winged wheels 22 having respective spaced shafts 21 oriented parallel to one another. The shafts 21 are arranged approximately parallel to the tangent of the wheel periphery 6 at the location of the stacking device 20. Each winged wheel 22 has two axially parallel wings 23 whose length approximately corresponds to the diameter of an article 2 as may be observed in FIG. 3. The wings 23 arcuately taper at their free end, and are only at a small lateral distance from the suction wheel 4. Approximately in the plane of the root of the wings 23 adjacent the periphery 6 of the suction wheel, a stop 24 is provided which has an elastic buffer 25. The leading edge of the incoming article 2 abuts against the stop 25 as illustrated in FIG. 3. The two shafts 21 are interconnected by gears 26 and thus run in synchronism. One of the gears 26 is driven by a stepping motor 27.

In the base position, the wings 23 are oriented in a manner shown in FIG. 4. As soon as the optical barrier 14 responds to the passage of an article 2, the winged wheels 22 are driven by means of the motor 27 in the direction of the arrow B through 180° after a predetermined delay as a function of the circumferential speed of the suction wheel 4 and the path length between the optical barrier 14 and the buffer 25. During the course of this motion, the incoming article 2 is lifted from the periphery 6 of the suction wheel 4 and placed flat against an article stack 32 previously formed. The illustrated design of the winged wheels 22 has the advantage that the path the articles have to travel is very short and accordingly, the acceleration and the stresses involved therewith are also small. Further, during their introduction into the stack-forming device 20, the articles 2 are guided by stationary guides 28 with converging run-in zones 29.

Figure 5:
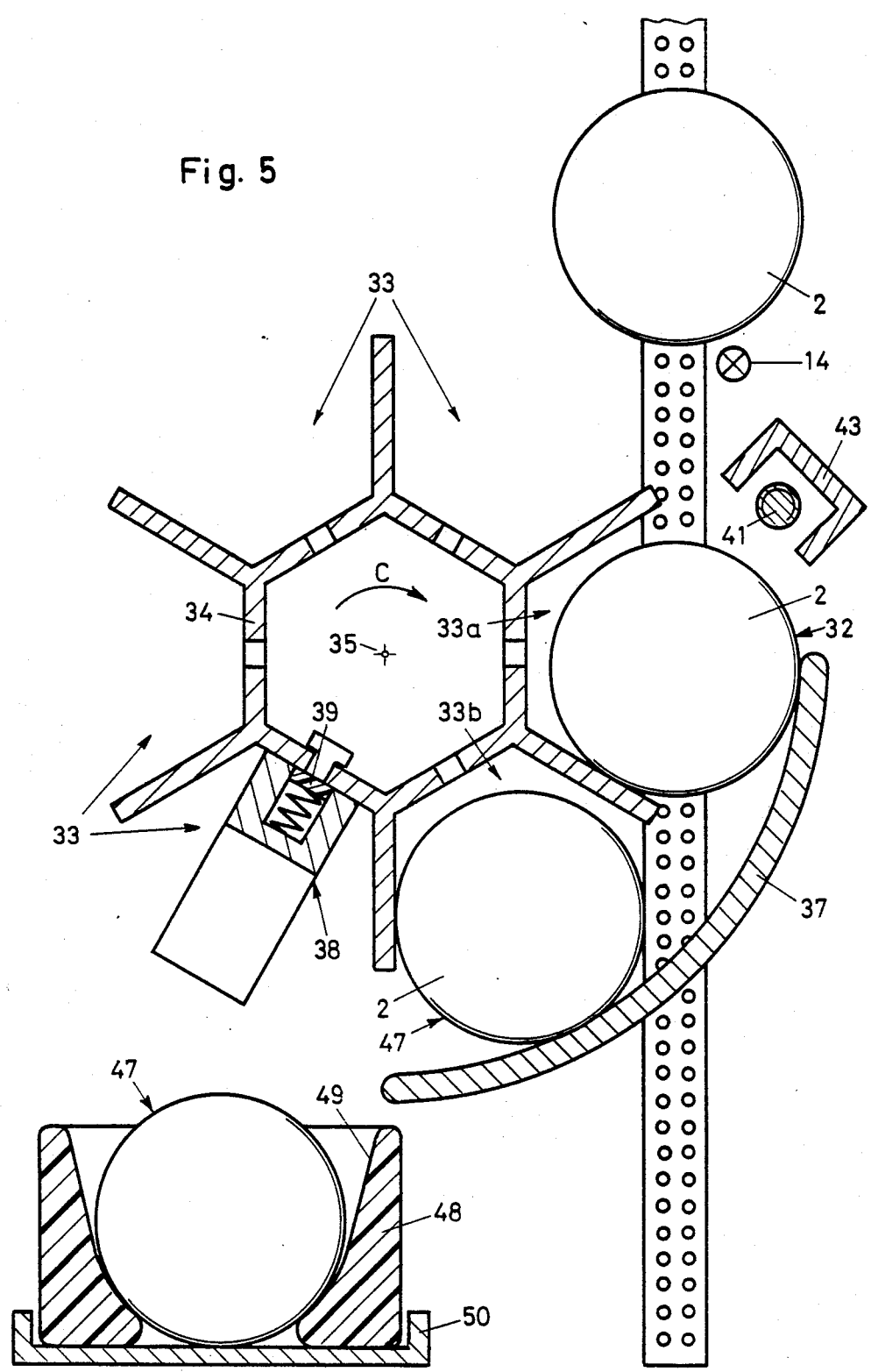
FIG. 5 is a sectional view taken along line V—V of FIG. 1.

Also referring to FIG. 5, the stack 32 is formed in an outwardly open prismatic chamber or trough 33 of a multichamber rotary magazine 34. The magazine 34 is intermittently rotatable (indexable) by means of a further stepping motor 36 about an axis 35 oriented approximately radially to the periphery of the suction wheel 4. The chamber 33a in which a stack 32 is under formation is closed outwardly partially by a stationary circular segment-shaped guide plate 37 which is, for better visibility, not shown in FIG. 1. Similarly, there the chamber 33a is illustrated at the top whereas in reality it is situated laterally as shown in FIG. 5. In each chamber 33 there is arranged a pickup base 38 which may be longitudinally displaced parallel to the axis 35 and which may be gently braked by a spring-biased brake shoe 39 to prevent the pickup base 38 from shifting under the effect of gravity. Just prior to charging a chamber 33, the associated pickup base 38 is in a forwardmost position and for each indexing (charging) step of the stacking device 20, the pickup base 38 associated with the chamber 33a which is being charged, is moved backwardly by a third stepping motor 40 which rotates a threaded spindle 41 causing rearward travel of a lug 42 threaded on the spindle 41. The lug 42, in turn, engages and pulls back the pickup base 38 to an extent which corresponds to the thickness of an article 2. The lug 42 is guided in a track 43 for longitudinal displacement and is, at the same time, prevented from rotating.

After a predetermined number of switching steps carried out by the stacking device 20 and the lug 42, the magazine 34, for example, by virtue of a signal applied to the stepping motor 36, performs its rotary indexing motion in the direction of the arrow C, as shown in FIG. 5. The group 47 of counted articles 2 at this time rests in the successive chamber 33b and the lug 42 arrives into the now-empty chamber 33a and engages the pickup base 38. The latter is, by means of the motor 40, displaced forwardly into the immediate vicinity of the stacking device 20, whereupon in the chamber 33a a new stack is formed. At the subsequent indexing of the magazine 34, the chamber 33 empties its contents into an empty pallet 48 which is placed in readiness on a ramp 50.

Referring once again to FIG. 1, the pallets 48 are rectangular and are made of a synthetic material. Between two oppositely located side faces there extends a cylindrical opening 49 which converges towards one side and which serves for loosely receiving the group 47 of the articles 2. The empty pallets are lined up on the inclined ramp 50 which extends parallel to the axis 35 of the magazine 34. The forwardmost pallet 48 abuts against an armature 51 of a solenoid 52. After the indexing motion of the magazine 34, thus, after the forwardmost ready pallet 48 is charged with the article group, the solenoid 52 is actuated and that pallet is released. Thereupon, the loaded pallet slides on the ramp 50 downwardly onto a conveyor belt 53 and is transported away thereby.

Figure 6:
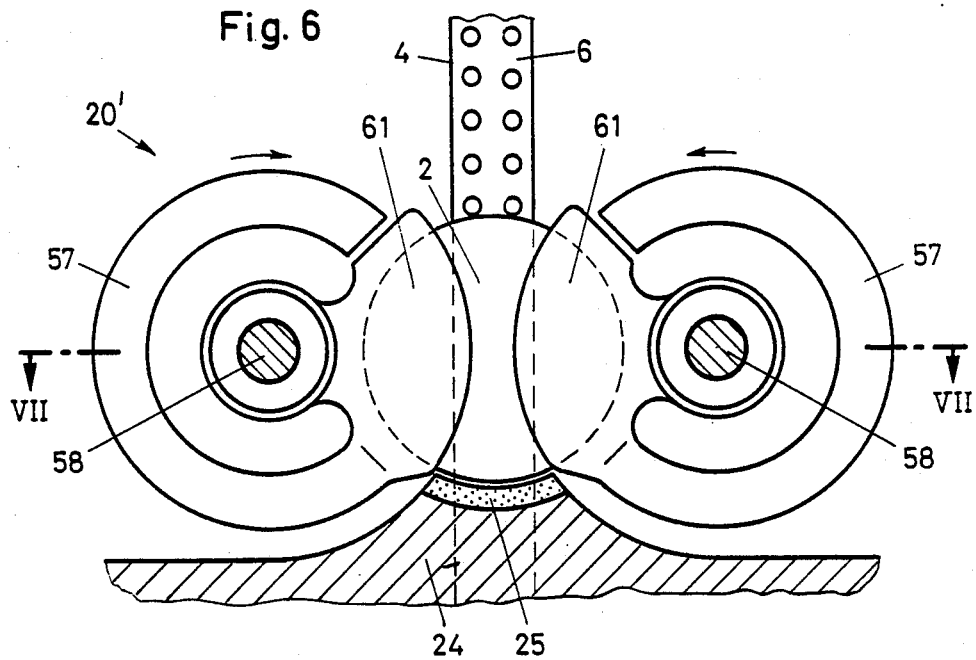
FIG. 6 is a sectional view similar to FIG. 3 of another embodiment of a stack-forming device.
Figure 7:
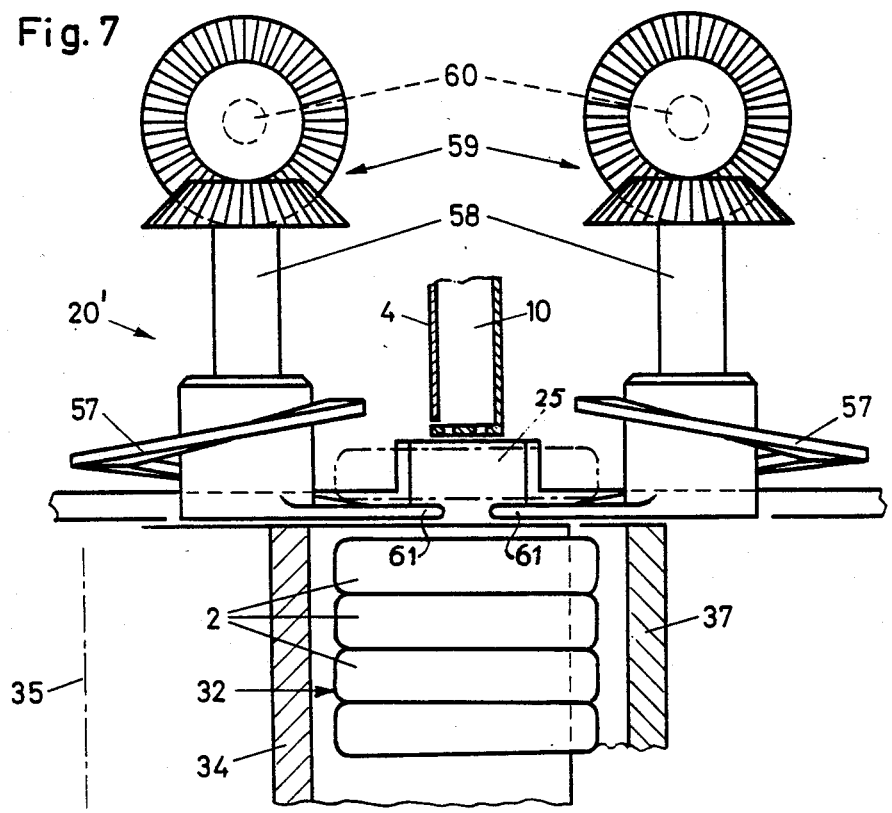
FIG. 7 is a sectional view taken along line VII—VII of FIG. 6.

Turning now to FIGS. 6 and 7, there is illustrated therein another embodiment of a stack-forming device generally designated at 20'. The stacking device 20' comprises two oppositely driven conveyor screws 57 which are arranged symmetrically to the central plane of the suction wheel 4. The parallel axes of rotation 58 of the conveyor screws 57 are oriented approximately radially to the periphery of the suction wheel 4 and parallel to the axis 35 of the magazine 34. They are connected by means of bevel gear sets 59 with drive shafts 60 corresponding to the shafts 21 of FIG. 3 and are driven by the stepping motor 27 which performs a full revolution for each switching step of the shafts 58. The augers of the conveyor screws 57 have an increased diameter at the forward end portion 61 which has been reduced to a very small pitch. The diameter of the other parts of the screws 57 is such that the auger crests have only a small lateral distance from the suction wheel 4.

The function of the stacking device 20 according to FIGS. 6 and 7 is identical to that of FIGS. 3 and 4 except that the screws 57 provide for an even more gentle acceleration of the articles 2 and for an even smaller distance of the articles 2 (which are to be lifted from the suction wheel 4) from the stack 32. For this reason, in the embodiment shown in FIGS. 6 and 7, it is also possible to arrange the stacking device 20' above the shaft 5 of the suction wheel 4 and accordingly, to arrange the axis 35 of the magazine 34 as well as the ramp 50 in a reverse inclined orientation. In this embodiment, no pickup base is needed in the magazine chambers 33. In this manner, it is also possible to index the magazine 34 as a function of the stack length. This embodiment is particularly expedient if the thickness of the articles 2 varies relatively significantly.

The present disclosure relates to subject matter contained in Swiss Patent Application No. 1090/87-9 (filed Mar. 23, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. An apparatus for forming consecutive groups of face-to-face stacked, flat articles, comprising
   (a) an input conveyor for advancing the articles arranged in a flat-lying orientation and in a column of indeterminate length and random spacing; said input conveyor having a discharge end;
   (b) a suction wheel having an air-pervious cylindrical peripheral face and a generally horizontally supported rotary shaft, said peripheral face being arranged for receiving the articles from said discharge end of the input conveyor in a random spacing on an upper portion of said suction wheel;
   (c) vacuum means for drawing air through said peripheral face for pressing the randomly spaced articles thereagainst during the downwardly sloping advance of the articles carried by said peripheral face;
   (d) a stack-forming device arranged for performing stacking steps by consecutively lifting off articles from said peripheral face and mechanically moving each article onto a trough into a face-to-face engagement with an outermost article of a group being under formation on said trough;
   (e) a stepping motor connected to said stack-forming device for operating the stack-forming device in steps;
   (f) a sensor means arranged at said peripheral face upstream of said stack-forming device as viewed in a direction of article advance on said peripheral face for generating a signal in response to a passage of each article on said peripheral face; said sensor means being connected to said stepping motor for causing the stack-forming device to perform a stacking step when receiving said signal;
   (g) a magazine including said trough; said magazine further including means for discharging the article group from said trough when the article group has reached a predetermined quantity characteristic; and
   (h) a removal conveyor means including receptacles periodically aligned with said magazine for receiving the article group discharged from the trough of the magazine.

2. An apparatus as defined in claim 1, wherein said sensor means comprises an optical barrier.

3. An apparatus as defined in claim 1, wherein said rotary shaft of said suction wheel has a height level; further wherein said stack-forming device is situated below said height level and extends from said peripheral face in a downward orientation; further comprising a pickup base movable in and along said trough and being arranged to engage a face of an outermost article of the article group being under formation; further comprising means for stepwise moving said pickup base in synchronism with the steps of said stack-forming base.

4. An apparatus as defined in claim 1, wherein said stack-forming device comprises two cooperating, parallel-spaced conveyor screws supported on opposite sides of said suction wheel; each conveyor screw having a rotary axis oriented perpendicularly to said peripheral face of said suction wheel adjacent said conveyor screws; said screws having helical augers cooperating with one another for engaging and lifting an article off said track and advancing the article into said trough.

5. An apparatus as defined in claim 1, wherein said magazine has an axis of rotation; said trough is present in a plurality in an array distributed circumferentially about the axis of rotation of the magazine; each said trough being open radially outwardly; and means for intermittently rotating said magazine about the axis of rotation thereof.

6. An apparatus as defined in claim 5, further comprising a movable abutment arranged for arresting each receptacle in alignment with said magazine for receiving an article group from one of the troughs upon rotation of the magazine; and means for moving the abutment into and out of a path of travel of the receptacles.

7. An apparatus as defined in claim 1, wherein said stack forming device includes a moving mechanism arranged for sequentially engaging the articles on the peripheral face and for moving away from the peripheral face, thereby lifting off the article from said peripheral face and moving said articles onto said trough; said stepping motor being connected to said moving mechanism.

8. An apparatus for forming consecutive groups of face-to-face stacked, flat articles, comprising
   (a) an input conveyor for advancing the articles arranged in a flat-lying orientation and in a column of indeterminate length; said input conveyor having a discharge end;
   (b) a downwardly curving track arranged for receiving the articles from said discharge end of the input conveyor;
   (c) a stack-forming device arranged for performing stacking steps by consecutively taking articles from said track and moving each article onto a trough into a face-to-face engagement with an outermost article of a group being under formation on said trough; the stack-forming device comprising two wheels supported on opposite sides of said downwardly curving track; each wheel having a rotary axis extending parallel to a tangent of said track at said wheels; each wheel having axially parallel extending wings arranged such that upon rotation of the two wheel the wings thereof together engage and lift an article off said track and advance the article onto said trough;
   (d) a stepping motor connected to said stack-forming device for rotating said wheels in steps;
   (e) a sensor means arranged at said downwardly curving track upstream of said stack-forming device as viewed in a direction of article advance on said track for generating a signal in response to a passage of each article on said track; said sensor means being connected to said stepping motor for causing the stack-forming device to perform a stacking step when receiving said signal;
   (f) a magazine including said trough; said magazine further including means for discharging the article group from said trough when the article group has reached a predetermined quantity characteristic; and
   (g) a removal conveyor means including receptacles periodically aligned with said magazine for receiving the article group discharged from the trough of the magazine.

9. An apparatus as defined in claim 8, wherein each wing has an arcuately tapering free end.

* * * * *